US005556076A

United States Patent [19]

Jacquay

[11] Patent Number: 5,556,076
[45] Date of Patent: Sep. 17, 1996

[54] TOILET LIFTING AND TRANSPORTING DEVICE

[75] Inventor: Ken Jacquay, Alexandria, Va.

[73] Assignee: Water Management, Inc., Alexandria, Va.

[21] Appl. No.: 417,997

[22] Filed: Apr. 6, 1995

[51] Int. Cl.$^6$ ........................................ B60P 1/48
[52] U.S. Cl. .......................... 254/8 R; 254/131
[58] Field of Search .................. 414/684.3, 691, 414/910, 911, 373; 254/8 R, 8 B, 2 R, 2 B, 113–118, 131

[56] References Cited

U.S. PATENT DOCUMENTS

| | | | |
|---|---|---|---|
| 2,600,577 | 6/1952 | Roe | 254/131 |
| 3,667,728 | 6/1972 | Garelick | 254/8 R |
| 3,809,261 | 5/1974 | Lee | 254/131 |
| 4,928,927 | 5/1990 | Fredrick et al. | 414/684.3 |
| 5,141,204 | 8/1992 | Marosy | 254/8 R |
| 5,203,065 | 4/1993 | Peters | 254/2 R |
| 5,232,203 | 8/1993 | Butts | 254/8 R |
| 5,382,131 | 1/1995 | Werthmann | 254/131 |

Primary Examiner—Robert C. Watson
Attorney, Agent, or Firm—Sughrue, Mion, Zinn, Macpeak & Seas

[57] ABSTRACT

A toilet lifting and transporting device is constructed from a piece of hollow steel tubing which is bent to define a U-shaped base frame having a pair of support legs extending upwardly from the sides of the base frame at substantially right angles thereto. A cross member interconnects the top ends of the support legs and a pair of support brackets are pivotally and slidably mounted on the cross member for engagement with a rearwardly extending horizontal flange on a toilet. A pair of wheels are mounted adjacent the ends of the U-shaped base frame for rotation about a common axis whereby the base frame may be pivoted upwardly about the axis to bring the brackets into engagement with the toilet flange. Upon pressing the U-shaped frame downwardly, the rear portion of the toilet will be elevated. The toilet may then be pivoted about the cross member and supported on a rod extending between the side members of the U-shaped base member.

4 Claims, 2 Drawing Sheets

TOILET LIFTING AND TRANSPORTING DEVICE

BACKGROUND OF THE INVENTION

The present invention is directed to a toilet lifting and transporting device and more specifically to a wheeled frame adapted to straddle the toilet, lift the toilet upon pivotal movement of the frame and subsequently transport the toilet.

In the placement or replacement of toilet bowls of the type bolted on the floor with a water tank mounted on a rearwardly extending flange, the plumber is faced with a number of problems. The toilet bowls are heavy and awkward and have to be lifted and accurately positioned in a bathroom, either when they are installed or removed for repair or replacement. Because of the restricted space, the plumber is subject to strain and there is a danger that the bowl will be broken by dropping or bumping it. When the bowl is repositioned or removed for repair, the problems are increased by the presence of water in the bowl or tank resulting in extra weight and the possibility of spillage.

A number of toilet bowl handling and transporting devices have been devised in the past. U.S. Pat. No. 3,391,905 discloses such a device which is comprised of a U-shaped base frame mounted on casters for transporting the handling apparatus. An elevating jack is mounted on the middle rear portion of the base frame and a main carrying boom is mounted on the jack for carrying the weight of a toilet bowl. A fixed clamping assembly is mounted on the free end of the carrying boom and is provided with clamp projections for overlying the upper flange of the toilet bowl and forwardly facing movable clamping jaws for insertion under the flange of the toilet bowl on the inside of the toilet bowl. After the clamping assembly is secured to the toilet bowl with the U-shaped frame straddling the base of the toilet, the jack is operated to raise the boom and thereby lift the toilet from the floor. Thus a number of screw operated clamps and a screw operated jack must be provided, which adds to the cost and complexity of the apparatus.

Other U.S. Pat. Nos. 3,262,790, 4,722,511 and 5,203,065 all show similar types of toilet lifting devices, each of which has a lifting jack mounted on the base frame for raising and lowering toilet bowl engaging members. Due to the complexity of the devices, the devices are expensive to build and complicated to operate.

In an unrelated field, a mobile desk lifter is disclosed in U.S. Pat. No. 2,937,850. In this patent, a foldable platform comprised of two planar sections is provided, each having complementary edges hinged together at a center joint. Each of the sections is provided on its underside with a pair of universally mounted wheels positioned remotely from the hinged joint. With the planar sections folded upwardly about the hinge, the lifter can be inserted into the knee hole space of a desk with the opposite ends of the platform disposed underneath each set of drawers. Upon exerting downward foot pressure on the hinge joint, the respective platforms will pivot about the wheels thereon and raise the desk until the two planar sections are disposed and locked in a horizontal plane. While such a lifting device is uniquely efficient for lifting and transporting desks of the type having a knee hole and two drawer pedestals, such a device would be totally incompatible with the configuration of a toilet.

SUMMARY OF THE INVENTION

The present invention provides a new and improved toilet lifting and transporting device which has all of the advantages of prior art lifting devices and none of the disadvantages.

The present invention provides a new and improved toilet lifting and transporting device which may be easily and efficiently manufactured.

The present invention provides a new and improved toilet lifting and transporting device which is of durable and rugged construction.

The present invention provides a new and improved toilet lifting and transporting device which permits the lifting, transporting and subsequent positioning of a toilet without the necessity of any manual lifting being performed by the moving individual.

The present invention provides a new and improved toilet lifting and transporting device which is of portable and lightweight construction whereby the device may be conveniently transported, stored and utilized.

The present invention provides a new and improved toilet lifting and transporting device for a toilet of the type having a horizontal flange extending rearwardly of a toilet bowl upon which a water tank is mounted, said device comprising a U-shaped frame having a plurality of wheels connected thereto for supporting said frame in a substantially horizontal position, a pair of vertical support legs connected to opposite ends respectively of said U-shaped frame, a horizontally disposed rod connected between said support members adjacent upper ends thereof, a pair of opposed J-shaped brackets pivotally and slidably mounted on said rod for engagement with opposite sides of said flange and a support member detachably supported on said frame and extending across said U-shaped frame for engaging and supporting a bottom surface of said toilet adjacent a forward end thereof to maintain said toilet in a substantially horizontal condition during transport.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
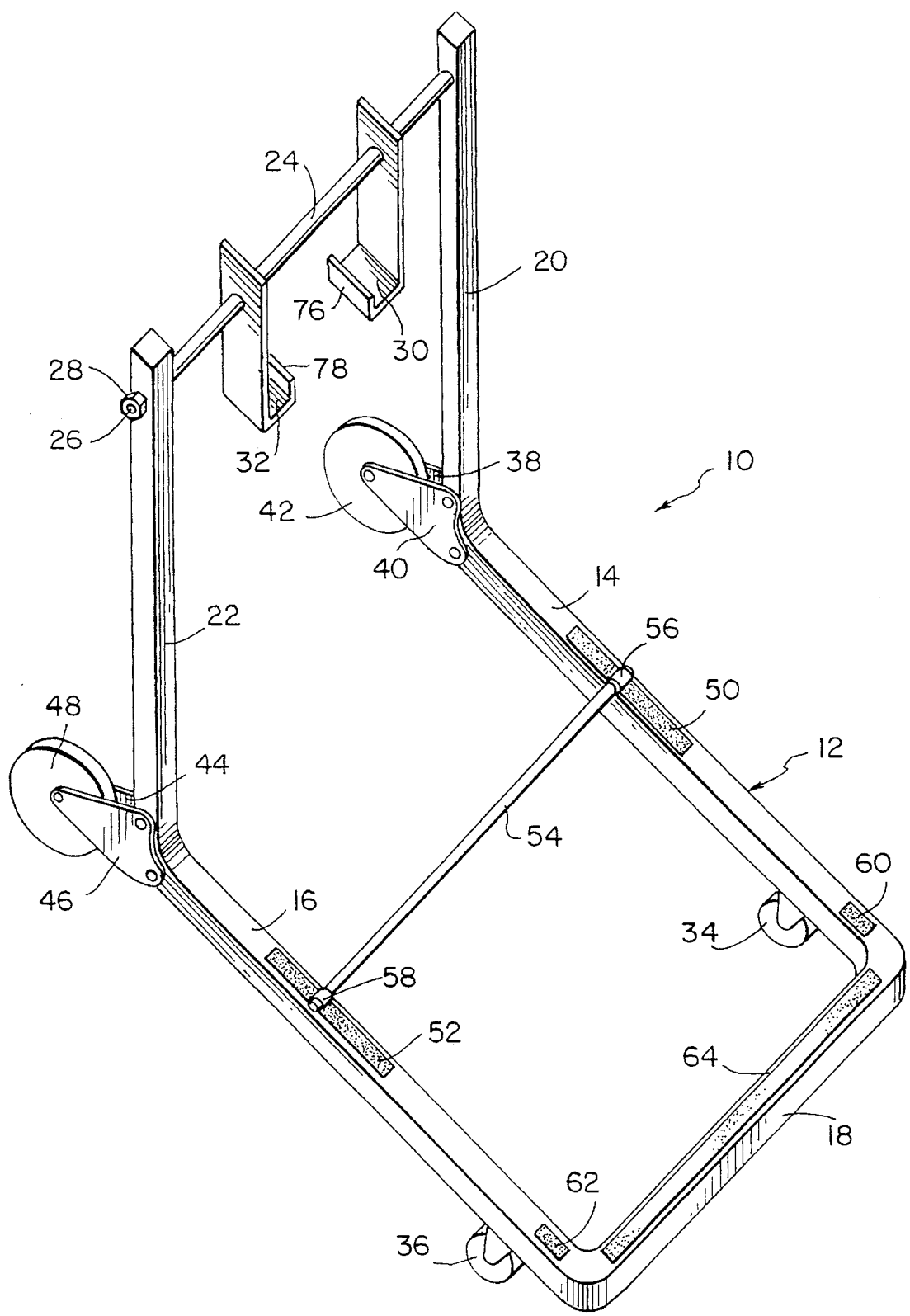
FIG. 1 is a perspective view of the toilet lifting and transporting device according to the present invention.

The toilet lift device 10 shown in FIG. 1 is basically comprised of a one piece hollow tubular steel frame 12, The frame 12 has a U-shaped configuration comprised of two parallel side members 14 and 16 interconnected by a transverse bight member 18 at a forward end of the lift, The ends of the legs 14 and 16 are bent upwardly at right angles to define a pair of vertically extending support legs 20 and 22, A hollow tubular steel rod 24 extends between the support legs 20 and 22 adjacent the upper ends thereof, A threaded rod 26 extends through the rod 24 and through aligned apertures in the support legs 20 and 22 and securing nuts 28, one of which is shown in FIG. 1, are threaded on opposite ends of the rod 26 so as to firmly clamp the tubular rod 24 between the support legs 20 and 22 to define an inverted U-shaped vertically extending support frame. A pair of opposed J-shaped brackets 30 and 32 are pivotally and slidably mounted on the hollow tubular rod 24.

A pair of casters or swivelled wheels 34 and 36 are mounted on the undersides of the side members 14 and 16 adjacent the bight member 18. As an alternative construction, it is possible to only use a single caster or swivelled wheel mounted centrally of the bight portion 18 on the underside thereof. A pair of rearwardly extending brackets 38 and 40 are secured to the frame 12 at the bend between the horizontally disposed side member 14 and the vertically disposed support leg 20 for rotatably supporting a wheel 42. A pair of similar brackets 44 and 46 are mounted on the frame 12 at the bend between the horizontally disposed side member 16 and the vertically disposed support leg 22 for rotatably supporting a wheel 48 having the same diameter as the wheel 42. The wheels have a common axis of rotation which is parallel to the bight member and disposed outwardly of the base frame. The diameter of the wheels 42 and 48 is relatively large, for example, on the order of 4 to 6 inches, so as to permit the device 10 to move up or down a flight of stairs with an action similar to that of a conventional two-wheeled hand truck.

A first pair of VELCRO-type strips 50 and 52 are mounted on the leg portions 14 and 16 respectively substantially adjacent the mid portion of the length of the leg portions. The length of the strips 50 and 52 may vary but it is best to provide strips of a substantial length so as to accommodate toilets of different sizes. A steel rod 54 has a length sufficient to span the difference between the two leg portions 14 and 16 with the ends thereof overlying the leg portions 14 and 16. Complementary VELCRO-like strips 56 and 58 are secured about the ends of the rod 54 whereby the rod can be detachably connected to the leg portions 14 and 16 due to the interaction between the VELCRO-like strips 50 and 56 and the VELCRO-like strips 52 and 58. Thus the rod can be adjustably secured to the leg portions 14 and 16 at different locations along the length thereof for the purpose of underlying and supporting the forward end of a toilet as will be described in detail hereinafter. The cross-section of the rod 54 may be rectangular, round or any other shape. A pair of additional VELCRO-like tabs 60 and 62 may be mounted on the upper surface of the leg portions 14 and 16 immediately adjacent the bight portion 18 for the purpose of securing the rod 54 in a non-interfering position during the initial lifting of a toilet. In lieu of separate tabs 60 and 62, the VELCRO strips 50 and 52 could be lengthened to extend substantially the entire length of each leg 14 and 16. An additional strip of anti-slip material 64 is secured to the upper surface of the bight to prevent the foot of an operator from slipping relative to the frame 12 during manipulation of the frame.

Figure 2:
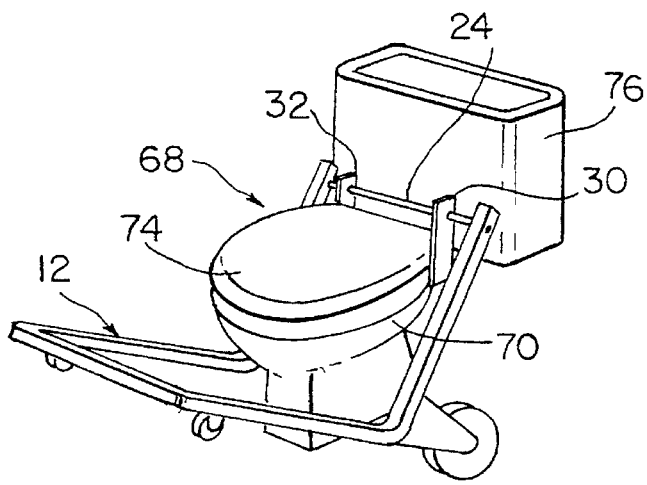
FIG. 2 shows the position of the device relative to a toilet for engaging the toilet prior to lifting.
Figure 3:
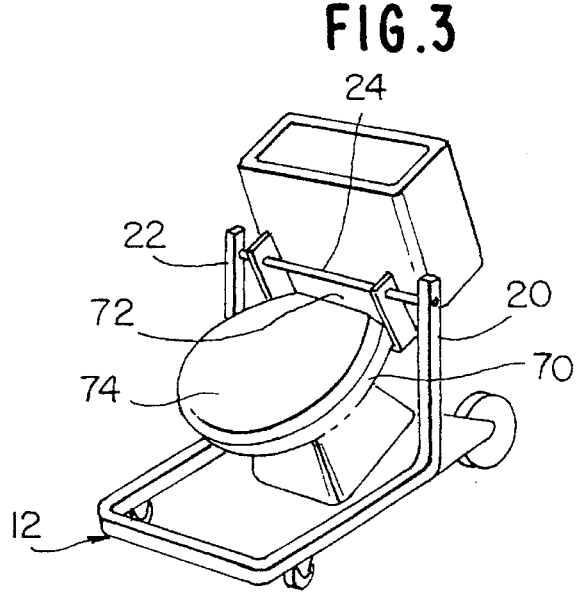
FIG. 3 illustrates the position of the toilet and frame with the toilet partially lifted from the floor.

In order to lift a toilet from the floor, it is only necessary to wheel the U-shaped frame 12 into a straddling position relative to the toilet 68 as shown in FIG. 2. Most toilets are comprised of a toilet bowl 70 having a rearwardly extending horizontal flange 72 as seen in FIG. 3 upon which the toilet seat 74 is pivotally mounted. The water tank 76 may also be mounted on the rearwardly extending horizontal flange 72.

The toilet lift device is pivoted upwardly about the axis of the wheels 42 and 48 as shown in FIG. 2 so as to bring the brackets 30 and 32 into position on opposite sides of the rearwardly extending horizontal flange 72. Brackets 30 and 32 are then moved towards each other on the rod 24 so as to locate the hook-like portions 76 and 78 under the flange 72.

Downward pressure is then applied to the bight portion 18 of the U-shaped frame 12, preferably by the application of foot pressure, so as to pivot the entire frame 12 about the axis of the wheels 42 and 48. As the support legs 20 and 22 move to a vertical position, as shown in FIG. 3, the rear end of the toilet will be lifted upwardly, due to the fact that the brackets on the rod 24 move upwardly. In this condition, the forward end of the base of the toilet is resting on the floor.

Figure 4:
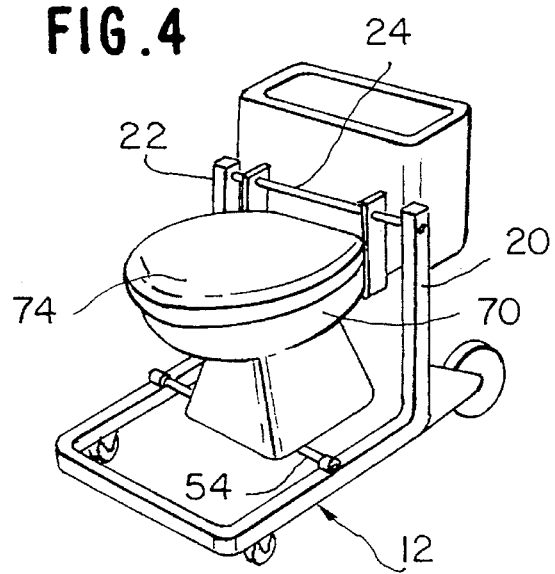
FIG. 4 shows the toilet completely mounted on the device for transport on the device.

The toilet may then be pivoted in a clock-wise manner about the rod 24 as viewed in FIG. 4 so as to raise the base of the toilet to a horizontally disposed position. The rod 54 may then be located under the forward end of the toilet with the opposite ends of the rod secured in position on the frame 12 by means of the VELCRO fasteners. The toilet may then be transported to the desired location. The toilet may then be unloaded by carrying out the foregoing steps in reverse order.

Although it is preferred to construct the frame and brackets, as well as the rods, from steel to provide the maximum strength for the various components, it is possible to secure other materials, provided the other materials have comparable strength. Although large diameter wheels 42 and 48 are provided for rotation about a fixed axis in order to enable the device 10 to traverse a flight of stairs, it is also possible to use swivelled wheels or casters at the rear end of the U-shaped frame 12, similar to the swivelled wheels or casters 34 and 36 mounted at the forward end of the frame.

The brackets 38 and 40 could be replaced by pivoted threaded members which could extend through the toilet seat holes in the flange and nuts could be threaded thereon. A cable could also be used by connecting opposite ends of the cable to the rod 24 with the cable extending under the toilet flange.

Instead of the Velcro fastener strips associated with the rod 54 and the leg portions 14 and 16, the rod 54 may be provided with brackets at opposite ends which are slidably mounted on the leg portions 14 and 16 for moving the rod to the desired position. The brackets may loosely engage the leg portions or may frictionally grip the leg portions so that the bar can be retained in an adjusted position.

While the invention has been particularly shown and described with reference to preferred embodiments thereof, it will be understood by those in the art that the foregoing and other changes in form and details may be made therein without departing from the spirit and scope of the invention.

What is claimed is:

1. A toilet lifting and transporting device comprising a U-shaped base member comprising first and second parallel side members and a bight member interconnecting a first end of each side member, wheel means mounted on said base frame for supporting said frame in a substantially horizontal position, an inverted U-shaped frame comprising first and second support legs connected to a second end of each side member and extending vertically upwardly at substantially right angles to said base frame, a cross member connected between upper ends of said support members, support means slidably and pivotally mounted on said cross member for engaging a rearwardly extending flange on a toilet upon tilting of said device about said wheel means and lifting said toilet upon return of said device to a position wherein the support frame is vertically disposed and a support member adjustably and detachably mounted on said side members of said base frame for underlying and supporting a forward end of the toilet.

2. A toilet lifting and transporting device as set forth in claim 1, wherein said wheel means are comprised of first and second wheels rotatably supported for rotation about a common axis on brackets extending rearwardly from and secured to said second ends of said side members, respectively whereby said base frame is pivoted upwardly about said axis to tilt said support frame to bring said support means into proximity to said flange on said toilet.

3. A toilet lifting and transporting device as set forth in claim 1, wherein said U-shaped base frame and said first and second support legs are constituted by a single piece of hollow steel tubing.

4. A toilet lifting and transporting device as set forth in claim 1, wherein said support means are comprised of a pair of opposed J-shaped brackets slidably and pivotally mounted on said cross member.

* * * * *